Sept. 15, 1964  J. J. KUPKA  3,148,507
AIR COMPRESSOR WITH POWER INCREASE AND SAFETY CONTROLS
Filed July 10, 1963  4 Sheets-Sheet 1

Fig. 1.

INVENTOR.
JOHN J. KUPKA
BY
ATTORNEY

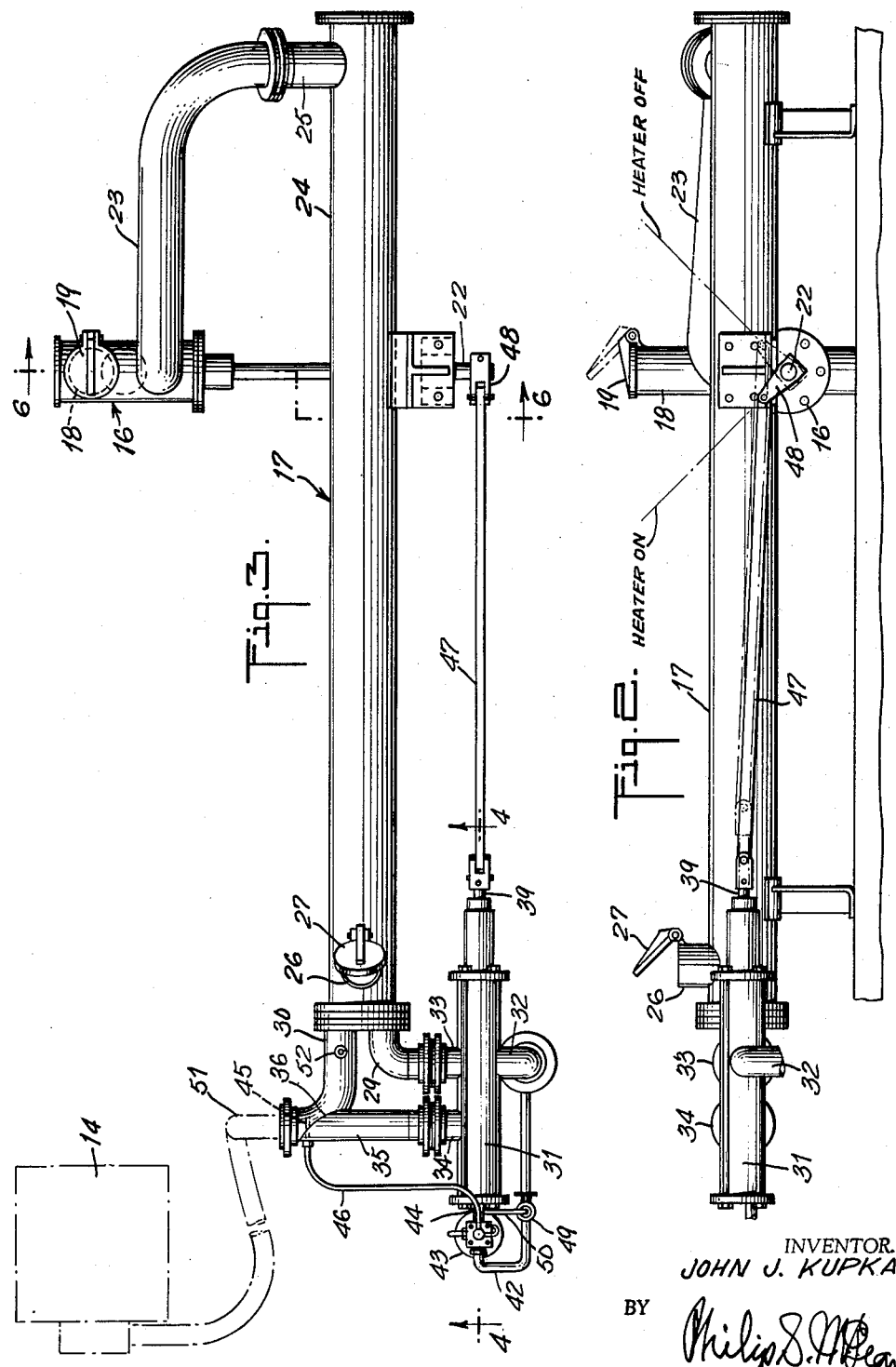

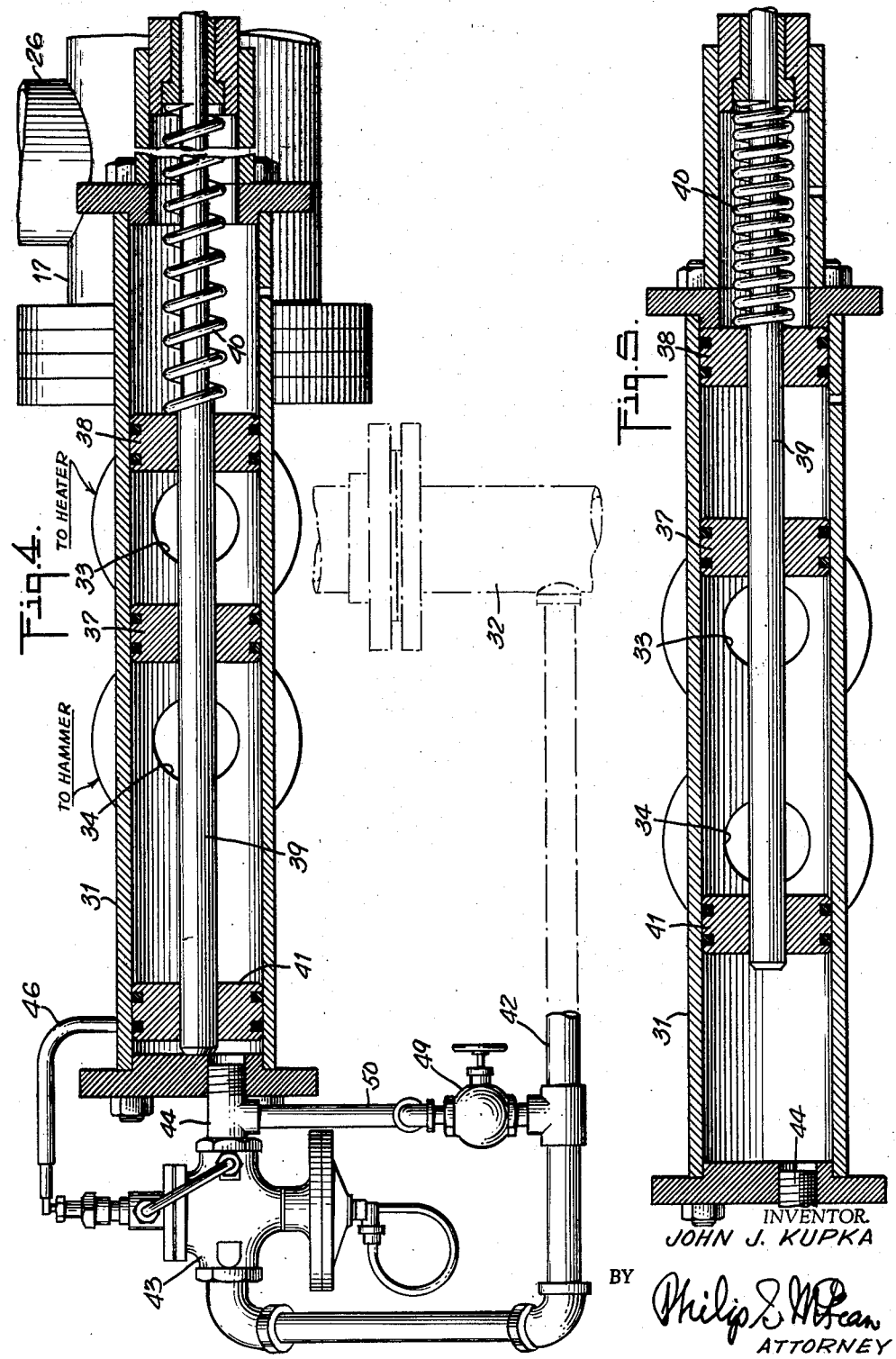

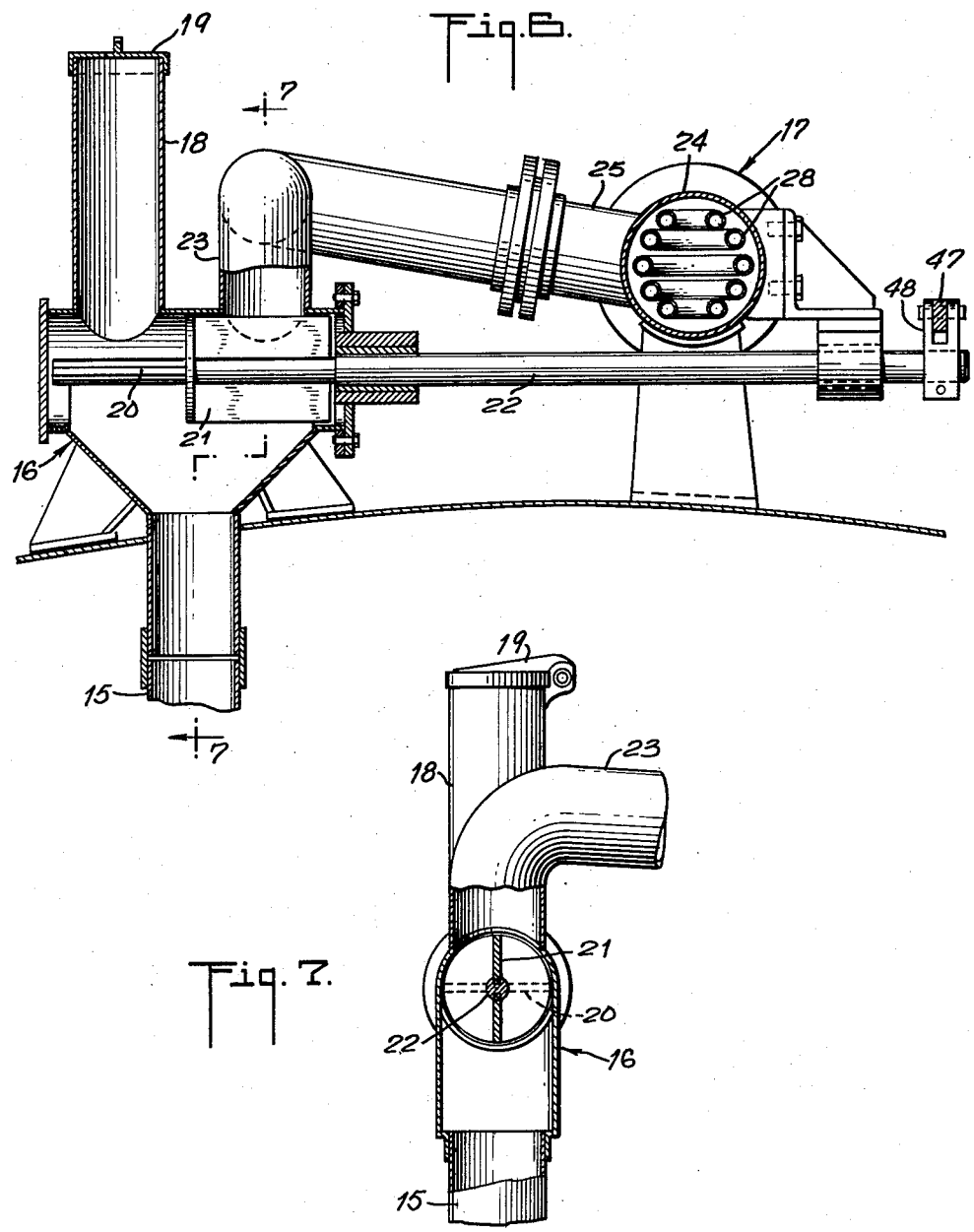

United States Patent Office 3,148,507
Patented Sept. 15, 1964

3,148,507
AIR COMPRESSOR WITH POWER INCREASE AND SAFETY CONTROLS
John J. Kupka, Gladstone, N.J., assignor, by mesne assignments, to Horn Pile & Foundation Corporation, Merrick, N.Y., a corporation of New York
Filed July 10, 1963, Ser. No. 294,059
14 Claims. (Cl. 60—59)

The invention herein disclosed relates to air compressors such as presently employed for supplying compressed air to power hammers and the like.

Objects of the invention are to increase the power output of such compressors without adding to the load on the engine driving the compressor, thus, by way of example, enabling a single compressor to serve in cases where it has heretofore been necessary to employ two compressors.

This has been accomplished by utilizing the heat of the exhaust from the engine to afterheat the air from the compressor before passing it on to the hammer or other machine driven from the compressor.

In this connection it is also an object of the invention to protect the system against overheating and thus to avoid possibility of any explosion or other such danger.

Other important objects of the invention are to accomplish the foregoing with relatively simple, practical apparatus of reasonable cost and readily combined with equipment presently in use.

The foregoing and other desirable objects are accomplished by novel features of construction, combination and relation of parts as disclosed and set forth in the following specification.

The drawings accompanying and forming part of this specification illustrate a present commercial embodiment of the invention, but it is to be understood that structure may be modified and changed in respect to the presently illustrated embodiment, all within the true intent and scope of the invention as hereinafter defined and claimed.

FIG. 1 in the drawings is a side elevation of a compressor having the invention incorporated in and combined therewith.

FIG. 2 is a broken side elevation on a slightly larger scale of the heat exchanger and related parts for heating the compressed air from the exhaust gas of the engine driving the compressor, with broken lines indicating different positions of the parts.

FIG. 3 is a broken plan view of the same.

FIGS. 4 and 5 are broken part sectional views of the air flow control valve, FIG. 4 on line 4—4 of FIG. 3, showing it in normal running position with relatively cold air from the compressor passing through to the heater and on to the hammer or other unit, and FIG. 5 showing this valve tripped to bypass the air away from the heater.

FIG. 6 is a broken cross sectional detail on substantially the plane of line 6—6 of FIG. 3, showing the exhaust control valve set to direct exhaust gas to the heater.

FIG. 7 is a broken sectional view through the exhaust gas control valve on substantially the plane of line 7—7 of FIG. 6.

In FIG. 1 there is illustrated an air compressor of conventional design, having a diesel engine 10 driving a compressor 11 delivering compressed air into a tank or receiver 12, having connections starting at 13 for supplying operating air to a power hammer or other power absorbing equipment indicated at 14.

The exhaust from the engine is, in this case, carried by the exhaust pipe 15 up to an exhaust control valve 16 which can be set to direct the hot gas to a heat exchanger 17 or to atmosphere by way of a stack pipe 18 shown as equipped with a rain cap 19.

Detailed construction of the exhaust control valve is shown in FIGS. 6 and 7 as consisting of vanes 20, 21 fixed at right angles on a shaft 22 in line respectively with the stack pipe 18 and with the pipe 23 extending to the heater.

This heat exchanger may be of conventional design embodying a shell 24 having an inlet 25 for exhaust gas at one end and an outlet 26 with rain cap 27 at the opposite end and containing a nest of tubing 28 for the air.

The enclosed heat absorbing air tubing is shown in FIG. 3 as having an inlet 29 and outlet 30, both at the same end of the heat exchanger.

This enables the air flow control valve mechanism to be compactly located at this one end of the heater in one housing.

The air flow control valve is shown as made up of a valve cylinder 31 having in one side an inlet 32 for air from the compressor, an outlet 33 oppositely located for passage of air to the heater inlet 29 and an outlet 34 offset from outlet 33 for passage of air through pipe 35 direct to the hammer or other tool.

The outlet 30 for the super heated air from the heat exchanger is shown in FIG. 3 as branched at 36 into the service piping 35.

Within control valve cylinder 31 are valve pistons 37, 38 on a piston rod 39 positioned and spaced to control flow through outlets 33 and 34.

A spring 40, FIG. 4 normally holds this valve assembly shifted to the left with outlet 33 open to air inlet 32 and a piston 41 on the end of rod 39 provides the power for shifting the valve assembly to the right as in FIG. 5 with outlet 34 open to inlet 32.

Thus, in the normal operating position shown in FIG. 4, air from the compressor will be passed through the heater and be discharged at 30, 36, 35, FIG. 3, to the power hammer and with the parts in position shown in FIG. 5, air from the compressor will be bypassed from the heater and sent direct through 34, 35 to the power utilizing device.

The air for operating the air flow control valve is shown in FIG. 4 as taken from the compressor supply pipe 32 by a connection 42 extended to a diaphragm valve 43, of conventional design, connected at 44 to the end of the valve cylinder 31.

The diaphragm valve, in the form shown, is normally closed, with the valve assembly standing in the position shown in FIG. 4, with air from the compressor passing through the heater and the heated air going on to the operating tool.

Operation of diaphragm valve 43 is effected in the illustration by a thermo sensitive probe 45, FIG. 3 at the junction of the heated air outlet 36 with the service pipe 35, arranged through the flexible tube connection 46 to cause that valve to open and pass air from the supply pipe 42 through inlet connection 44 into the end of valve cylinder 31 to thereby shift the bypass control valve to the right as in FIG. 5.

Thus, with rise in temperature of the heated air beyond a predetermined fixed point, the supply of air from the compressor will be automatically bypassed from the heater and sent, without afterheating, direct to the operating tool.

This flow of compressor air away from the heater will have the effect of extracting heat from the heater and other mass parts to stop temperature increase and prevent any rise of temperature accompanying the shutoff of heating operations.

The power employed for operating the air flow control valve 31 is utilized for simultaneously operating the exhaust flow control valve 16 by provision of a pivoted link 47, FIGS. 2 and 3, extended from the end of piston rod 39 to a rocker arm 48 on the end of the exhaust valve shaft 22.

In FIG. 2 the full lines indicate the FIG. 4 position of valve parts with the afterheater in operation and the broken lines indicate the FIG. 5 position of valve mechanism with the afterheater bypassed.

Provision is made in the present illustration for holding the valve mechanism in the heater bypassed relation, shown in FIG. 5, in the form of a hand valve 49, FIG. 4, normally closed but which can be opened to pass air from supply line 42 through pipe 50 direct to the inlet 44 of the powered control valve 31. This manually operable valve has the effect of bypassing the thermo sensitive automatic control.

FIGS. 1 and 3 show the hammer or other machine at 14 connected with the supply or service pipe 35, for example, by flexible hose 51.

A desirable warning signal is provided in the illustration in the form of a fusible plug 52, FIG. 3, inserted in the heated air outlet 30 from the heat exchanger, which will blow when a dangerous temperature is approached and thus sound off a warning for the operator in charge.

*Operation*

With the parts set for normal operating conditions, as shown in FIGS. 1, 3 and 4, exhaust gas from the engine 10 will pass upthrough exhaust pipe 15 and the opened vane 21 of exhaust control valve 16, FIG. 6, through connections 23, 25, into the right hand end of the heat exchanger and out through the stack 26 at the opposite end.

Air will pass from the air tank 12 through connections 13, 32 to the air control valve 31 and out through connections 33, 29, FIG. 3, into one end of the air tubing in the heater and out through connections 30, 36 into the service line 35 supplying power to the hammer or other air consuming unit.

In practice relative cold air from the compressor at approximately 200° F. and at a pressure around 120 p.s.i. may be raised to a safe operating temperature of about 400° F. and a continuing pressure of approximately 120 p.s.i.

Actual tests show that this increase in temperature at approximately the same pressure will provide a power increase on the order of 27 percent or more, enabling a single efficient air compressor to take the place of two compressors heretofore required in heavy work installations.

In the event of any unsafe rise in temperature the thermo sensitive controlled diaphragm valve 43, FIGS. 3 and 4, triggered by probe 45 in the heated air line will energize the powered air flow control valve 31, shifting it to the right hand position, shown in FIG. 5, to thereby communicate the air inlet 32 with the outlet 34 opening to the line 35, leading direct to the operating tool.

This bypassing of the compressed air away from the heater by extraction of heat from the mass of metal in the system stops further heating of the air supplied to the tool and enables compressor temperature air to immediately start lowering temperature of the heater.

Simultaneously with this bypassing of the air from the heater, the exhaust control valve 16 is actuated, as indicated in the broken lines FIG. 2, to shift to the reverse position from that shown in FIGS. 6 and 7 to a position with vane 21 shutting off flow through outlet 23 to the heater and vane 20 opening exhaust flow direct to the stack 18.

Thus, the thermo sensitive valve mechanism is effective both to cut off exhaust gas flow to the heater and to bypass compressor air away from the heater.

This mechanism may be set to automatically take control in the event of any near approach to what may be known to be an unsafe operating temperature, for instance anything above 400° F.

The sound warning provided by melting of the fuse 52, FIG. 3, in the heated air outlet is ordinarily desirable as a supplementary warning that operating temperatures are approaching a dangerous condition.

The after heating of the compressor air in addition to the power increase assures more effective starting and operation of the power hammer or other machine and overcomes freezing and other harmful or limiting effects caused by high humidity.

The limiting of the temperature increase, aside from the safety factor is of advantage in avoiding any injury to the tool or parts associated therewith, particularly flexible hose equipment.

While the thermo sensitive control illustrated has proved very effective it is contemplated that other forms, such as thermo switch controls may be used with equal effect.

In the FIG. 5 position of the powered air flow control valve both outlets 33 and 34 are open to the air inlet 32 so that in addition to the flow of air direct to the service line air will be drawn from the heater to reduce temperature.

The heat exchanger acting as a muffler eliminates need for that as a separate item and by replacing the muffler keeps down space and weight factors.

The heat exchanger through its regenerative or feed back action collects, recovers, conserves and saves heat energy which otherwise would be lost, this being considerable with exhaust temperatures of the diesel running in the region of 800° F.

While diesel engines are usually employed, it is contemplated that other internal combustion engines may be used.

One of the special advantages of this power conserving system is that by operating with the heated compressed air, compressed air hammers may be used without freeze up caused by the expanding air and which, in the past has limited operations to steam hammers only.

The tempered air employed in this system permits full operating expansion without resulting in freezing conditions.

The location of the heater and control valves directly over the engine and compressor, as shown in FIG. 1, conserves space, places these members in the best heat receptive relation and enables use of few, short, direct connections.

The use of known, standard parts so far as possible, keeps the overall cost within reasonable limits and facilitates possible replacement and repair.

The afterheater with its controls for the exhaust gas and for the compressed air constitutes a heat and energy conserving unit which may be combined to advantage with various internal combustion engine and compressed air systems, enabling in some cases compressed air to be used where otherwise it would be impractical because of freezing resulting from expansion of the compressed air.

The fuse 52 in the afterheated compressed air line 30, FIG. 3, may be considered in the nature of a "fail safe" warning, notifying an operator in charge, for example, of a failure in or late operation of the automatic control.

What is claimed is:

1. Power conserving air compressor system, comprising the combination of an internal combustion engine driving a compressor, a heat exchanger connected to take the exhaust from the engine and have heat absorbing air tubing connected to take air from the compressor and to pass heated compressed air on to a compressed air utility, and thermo sensitive controlled means for automatically diverting exhaust away from said heat exchanger and bypassing compressor air away from the heat exchanger.

2. Power conserving air compressor system, comprising the combination of an internal combustion engine driving a compressor, a heat exchanger connected to take the exhaust from the engine and having heat absorbing air tubing connected to take air from the compressor and to pass heated compressed air on to a compressed air utility, and thermo sensitive controlled means for automatically diverting exhaust away from said heat exchanger and bypassing compressor air away from the heat exchanger, said means including valve mechanism for directing exhaust into or away from said heat exchanger, valve mechanism for directing air from the compressor into or away from said exchanger and common means for operating both said valve mechanisms.

3. Power conserving air compressor system, comprising the combination of an internal combustion engine driving a compressor, a heat exchanger connected to take the exhaust from the engine and having heat absorbing air tubing connected to take air from the compressor and to pass heated compressed air on to a compressed air utility, and thermo sensitive controlled means for automatically diverting exhaust away from said heat exchanger and bypassing compressor air away from the heat exchanger, said means including valve mechanism for directing exhaust into or away from said heat exchanger, valve mechanism for directing air from the compressor into or away from said heat exchanger and common means for operating both said valve mechanisms, including a power cylinder connected with the supply of air from the compressor and a piston operating in said cylinder and connected with both said valve mechanisms.

4. Power conserving air compressor system, comprising the combination of an internal combustion engine driving a compressor, a heat exchanger connected to take the exhaust from the engine and having heat absorbing air tubing connected to take air from the compressor and to pass heated compressed air on to a compressed air utility, thermo sensitive controlled means for automatically diverting exhaust away from said heat exchanger and bypassing compressor air away from the heat exchanger, and manually operable means for short circuiting said thermo sensitive controlled means.

5. Power conserving air compressor system, comprising the combination of an internal combustion engine driving a compressor, a heat exchanger connected to take the exhaust from the engine and having heat absorbing air tubing connected to take air from the compressor and to pass heated compressed air on to a compressed air utility, thermo sensitive controlled means for automatically diverting exhaust away from said heat exchanger and bypassing compressor air away from the heat exchanger, said means including valve mechanism for directing exhaust into or away from said heat exchanger, valve mechanism for directing air from the compressor into or away from said heat exchanger and common means for operating both said valve mechanisms, including a power cylinder connected with the supply of air from the compressor and a piston operating in said cylinder and connected with both said valve mechanisms, and manually operable valve means connected with the air supply from the compressor and connected to effect operation of said piston.

6. Power conserving air compressor system, comprising the combination of an internal combustion engine and compressor operated thereby, a heat exchanger connected to take the exhaust from said engine and having heat absorbing air tubing connected to take air from the compressor and to pass heated compressor air to a point of consumption, thermo sensitive control means for automatically directing exhaust away from the heat exchanger, and means for arbitrarily actuating said means for directing the exhaust, air flow connections from said compressor to the heat exchanger and from the heat exchanger to the point of consumption, said thermo sensitive control means including a thermostat located in said connections from the heat exchanger to the point of consumption and forming part of said thermo sensitive control means.

7. An air compressor system comprising the combination of an internal combustion engine, an air compressor operated thereby, a heat exchanger, exhaust connections from the engine to said heat exchanger, a power hammer, and compressed air connections from said compressor through said heat exchanger to said power hammer, including valve mechanism adjustable to direct air from the compressor through said heat exchanger or to divert the air from the compressor away from the heat exchanger and direct to the power hammer.

8. An air compressor system comprising the combination of an internal combustion engine, an air compressor operated thereby, a heat exchanger, exhaust connections from the engine to said heat exchanger, a power hammer, and compressed air connections from said compressor through said heat exchanger to said power hammer, including valve mechanism adjustable to direct air from the compressor through said heat exchanger or to divert the air from the compressor away from the heat exchanger and direct to the power hammer, and said exhaust connections from the engine to the heat exchanger including control valve means for directing exhaust from the engine away from said heat exchanger to atmosphere.

9. An air compressor system comprising the combination of an internal combustion engine, an air compressor operated thereby, a heat exchanger, exhaust connections from the engine to said heat exchanger, a power hammer, and compressed air connections from said compressor through said heat exchanger to said power hammer, including valve mechanism adjustable to direct air from the compressor through said heat exchanger or to divert the air from the compressor away from the heat exchanger and direct to the power hammer, and said exhaust connections from the engine to the heat exchanger including control valve means for directing exhaust from the engine away from said heat exchanger to atmosphere, a motor for operating both said compressed air control valve means and said exhaust control valve means, and manually operable means for effecting operation of both compressed air and exhaust valve control means independently of said motor.

10. An air compressor system comprising
an internal combustion engine,
an air compressor operated thereby,
a heat exchanger over said engine and compressor,
exhaust connections from said engine to said heat exchanger including valve means for directing exhaust to said heat exchanger or away from said heat exchanger,
compressed air connections from the compressor to said heat exchanger including a control valve for directing compressed air to said heat exchanger or away from said heat exchanger,
said exhaust control valve means and compressed air control valve being located in heat receptive relation above the engine and compressor at the side of said heat exchanger.

11. An air compressor system comprising the combination of
an internal combustion engine,
an air compressor operated thereby,
a heat exchanger,
exhaust connections from the engine to said heat exchanger,
compressed air connections from the compressor to said seat exchanger, including
control valve means for bypassing air from the compressor away from said heat exchanger,
a thermo sensitive element in said compressed air connections, and
means under control of said element for effecting operation of said control valve means.

12. The combination of
a heat exchanger for heating the supply of compressed air passing to a compressed air utility from the exhaust gas of an internal combustion engine,
exhaust gas connections to said heat exchanger including control valve mechanism for directing exhaust gas into or away from said heat exchanger,
compressed air connections including control valve mechanism for directing compressed air into or away from said heat exchanger, and
means for operating said exhaust control valve mechanism and compressed air control valve mechanism to direct exhaust gas and compressed air to said heat exchanger or to direct exhaust gas and compressed air away from said heat exchanger.

13. An air compressor system comprising a combination of
an internal combustion engine,
an air compressor operated thereby,
a heat exchanger,
exhaust connections from the engine to said heat exchanger,
compressed air connections from the compressor to said heat exchanger,
connections for heated compressed air extending from said heat exchanger, and
thermo sensitive control means including a fusible plug located in said heated compressed air connections and subjected to temperature of the heated air in said connections for releasing compressed air heated above a predetermined maximum temperature.

14. The invention according to claim 11 with connections for heated compressed air extending away from said heat exchanger and
a fusible plug in said heated compressed air connections subjected to flow of the heated compressed air for releasing compressed air heated above predetermined maximum temperature.

References Cited in the file of this patent

UNITED STATES PATENTS

| | | |
|---|---|---|
| 2,166,940 | Conradson | July 25, 1939 |
| 2,298,625 | Larrecq | Oct. 13, 1942 |
| 2,309,983 | Riddle | Feb. 2, 1943 |
| 3,055,647 | Morrison et al. | Sept. 25, 1962 |

FOREIGN PATENTS

| | | |
|---|---|---|
| 410,078 | Germany | Feb. 23, 1925 |